(12) United States Patent
Alvarez et al.

(10) Patent No.: US 8,789,182 B2
(45) Date of Patent: Jul. 22, 2014

(54) SECURITY EVENT LOGGING IN PROCESS CONTROL

(75) Inventors: Fernando Alvarez, Untersiggenthal (CH); Frank Hohlbaum, Bad Säckingen (DE); Gunnar Hilpert, Küssaberg (DE)

(73) Assignee: Abb Technology AG, Zurich (CH)

( * ) Notice: Subject to any disclaimer, the term of this patent is extended or adjusted under 35 U.S.C. 154(b) by 0 days.

(21) Appl. No.: 13/572,247

(22) Filed: Aug. 10, 2012

(65) Prior Publication Data

US 2013/0055389 A1 Feb. 28, 2013

(30) Foreign Application Priority Data

Aug. 31, 2011 (EP) ..................................... 11179613

(51) Int. Cl.
 *G06F 21/00* (2013.01)
(52) U.S. Cl.
 USPC .............. 726/22; 709/203; 719/313; 700/297
(58) Field of Classification Search
 USPC ............................... 726/22; 718/313; 719/313
 See application file for complete search history.

(56) References Cited

U.S. PATENT DOCUMENTS

| | | |
|---|---|---|
| 2007/0283194 A1 | 12/2007 | Villella et al. |
| 2008/0127210 A1* | 5/2008 | Bosold et al. ................. 719/313 |
| 2010/0020724 A1 | 1/2010 | Wimmer et al. |
| 2010/0211826 A1 | 8/2010 | Villella et al. |
| 2011/0288692 A1* | 11/2011 | Scott ............................ 700/297 |

FOREIGN PATENT DOCUMENTS

EP   1 976 218 A1   10/2008

OTHER PUBLICATIONS

Yi et al; "An IEC 61850 Universal Gateway Based on Metadata Modeling"; 5 pages; Power Engineering Society General Meeting, 2007. IEEE; Jun. 2007.*
Adamiak et al; "Practical applications of peer-to-peer messaging in industrial facilities"; 10 pages; IEEE; 2012.*
IEC TC57 Security Standards for the Power System's Information Infrastructure—Beyond Simple Encryption ; Frances Cleveland;Transmission and Distribution Conference and Exhibition, 2005/2006 IEEE PES ; 9 pages.*
Substation automation. ied integration and availability of information; JD McDonald—Power and Energy Magazine, IEEE, 2003; 10 pages.*
Search Report issued on Jan. 12, 2012, by the European Patent Office for Application No. 11179613.2.
Quittek et al., "Requirements for Energy Management; draft-ietf-eman-requirements-01.txt", Internet Engineering Task Force, Internet Society (ISOC) 4, Mar. 2011, pp. 1-22.

* cited by examiner

*Primary Examiner* — Jason Lee
(74) *Attorney, Agent, or Firm* — Buchanan Ingersoll & Rooney P.C.

(57) ABSTRACT

A method and gateway are provided for extracting 61850 security events from general IEC 61850 events and merging them together with standard IT or other security events at station level or even higher system levels. Thus, the coexistence of two different protocols on the substation bus is allowed, providing greater flexibility in the design of a Substation Automation (SA) system, for example in SA systems with a mix of IEC 61850-compliant Intelligent Electronic Devices (IEDs) and SA devices that do not adhere to IEC 61850 communication protocols.

10 Claims, 1 Drawing Sheet

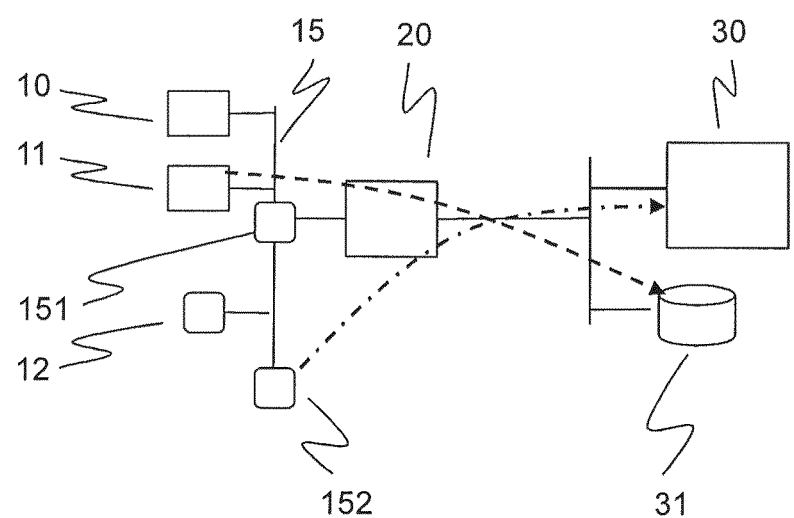

SECURITY EVENT LOGGING IN PROCESS CONTROL

RELATED APPLICATION

This application claims priority under 35 U.S.C. §119 to European Patent Application No. 11179613.2 filed in Europe on Aug. 31, 2011, the entire content of which is hereby incorporated by reference in its entirety.

FIELD

The present disclosure relates to Industrial Automation and Control Systems, such as Substation Automation systems with a standardized configuration representation. More particularly, the present disclosure relates to the handling and logging of security events in such systems.

BACKGROUND INFORMATION

Substation Automation (SA) systems supervise, monitor, protect and control substations in high and medium-voltage electrical power networks. This is done by protection and control devices allocated to the bays and/or to the primary equipment of the substation, as well as by station level devices including gateways and Human Machine Interfaces (HMI). Protection and control devices of the SA system close to the process generate events, including warnings and alarm signals, related to primary equipment or secondary equipment, or related to protection or control functions. Corresponding reporting messages are formatted according to a suitable protocol and transmitted on a SA communication network of the SA system to the station level devices for logging, archiving and/or evaluation. Furthermore, alarms may be provided for imminent graphical representation in an operator HMI, for example, for optical display in a single line overview picture, for an operator to investigate the origin of a disturbance.

Recently introduced security standards directed to the utilities operating distributed systems such as transmission and distribution systems for electrical power, water, or gas, specify that security relevant events are likewise stored and available for later retrieval. In the context of the present disclosure, security relevant events relate to cyber security or Information Technology (IT) security and as such are not directly linked to the operational aspects of the substation. Regulations, such as SOX (Sarbanes-Oxley Act), NERC-CIP (North American Electric Reliability Corporation-Critical Infrastructure Protection), and others are requiring organizations to implement comprehensive security measures, which may include collecting and analyzing logs, for example, the basic security event reports stored in a log archive and originating from many different sources.

Event logging was originally done locally and later centralized storage and central viewing of events became a standard feature in distributed systems. In this context, the Syslog protocol (including a simple communication protocol and a rudimentary data format definition) as documented in the Request for Comments (RFC) 3164 and 5424 of the Internet Engineering Task Force (IETF) is the de facto standard in the IT area for logging event data for later retrieval. Syslog allows separation of the software that generates messages from the system that stores them and the software that reports and analyzes them. The Syslog protocol is used to convey event notification messages, and includes a message format that allows vendor-specific extensions to be provided in a structured way.

A communication standard for communication between the secondary devices of a substation has been introduced by the International Electrotechnical Committee (IEC) as part of the standard IEC 61850, entitled "Communication Networks and Systems in Substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. As any other process automation protocol with standardized application semantics, IEC 61850 provides for process related events, with a special format for security related events.

SA systems based on IEC 61850 are configured and described by means of a standardized configuration representation or formal system description called Substation Configuration Description (SCD). An SCD file includes the logical data flow between the Intelligent Electronic Devices (IEDs) and the relation between the IEDs as well as the functionality which the IEDs execute on behalf of the substation. In addition to SA systems for substations in high and medium-voltage electrical power systems, other Process Control systems for, for example, hydro power plants, wind power systems, and Distributed Energy Resources (DER), may likewise be described by a formal system description at least partly identical to the IEC 61850 SA description.

Despite the existence of the standard IEC 61850 protocols, SA devices such as sensors, communication network equipment, and general purpose computers exist that do not adhere to the IEC 61850 standard yet are included in a SA system along with the IEC 61850 compliant IEDs. These SA devices implement a number of formerly used transmission protocols for exchanging operational data, collectively referred to as pre-IEC 61850 protocols. According to EP-A 1976218, a proxy IED is configured as a gateway device for converting data between pre-IEC 61850 and IEC 61850 communication protocols. The proxy IED is configured, based on a set of mappings, which are coded in the SA configuration description (SCD) file.

SUMMARY

An exemplary embodiment of the present disclosure provides a method of handling security events in a Process Control (PC) system, which includes a communication network interconnecting devices of the PC system. The exemplary method includes transmitting, on the communication network, by first and second devices of the PC system, security event messages including security event information according to a first protocol and a second protocol, respectively. The first protocol is one of a IEC 61850-7-4 protocol and a Syslog protocol, and the second protocol is the other one of the IEC 61850-7-4 protocol and the Syslog protocol. The exemplary method includes receiving a first security event message according to the first protocol, and extracting security event information from the first message also includes mapping the extracted security event information to the second protocol.

An exemplary embodiment of the present disclosure provides a gateway device for a Substation Automation (SA) system automating an electrical power substation. The gateway device is configured to be connected to a substation communication network interconnecting Intelligent Electronic Devices (IEDs) transmitting security event messages according to a IEC 61850-7-4 protocol and to SA devices transmitting security event messages according to a Syslog protocol. The gateway device is configured to receive a security event message from an IED or from an SA device according to the respective protocol. In addition, the gateway device is configured to map security event information extracted from the message to the other respective protocol.

An exemplary embodiment of the present disclosure provides a non-transitory computer-readable recording medium having a computer program recorded thereon that causes a processor of a computer processing device to handle security events in a Process Control (PC) system, which includes a communication network interconnecting devices of the PC system. In the PC system, first and second devices transmit, on the communication network, security event messages including security event information according to a first protocol and a second protocol, respectively. The first protocol is one of a IEC 61850-7-4 protocol and a Syslog protocol, and the second protocol is the other one of the IEC 61850-7-4 protocol and the Syslog protocol. The computer program causes the process to execute operations including: receiving a first security event message according to the first protocol, and extracting security event information from the first message; and mapping the extracted security event information to the second protocol.

BRIEF DESCRIPTION OF THE DRAWINGS

Additional refinements, advantages and features of the present disclosure are described in more detail below with reference to exemplary embodiments illustrated in the attached drawing, in which:

FIG. 1 schematically shows two security event information transmission paths according to an exemplary embodiment of the present disclosure.

DETAILED DESCRIPTION

Exemplary embodiments of the present disclosure provide greater flexibility in the engineering and configuration of an industrial Process Control system with security event handling. These features are achieved by a method of handling security events and by a gateway device as described herein.

According to an exemplary embodiment of the present disclosure, security relevant events in a Process Control (PC) system are handled in a manner that does not require the devices of the PC system to use a single protocol for security event reporting. Hence, the various devices of the PC system, such as Intelligent Electronic Devices (IED), sensors, general purpose computers, gateway devices that are connected to a communication network, as well as the network elements of the latter, may continue broadcasting security event messages according to their preferred protocol over the communication network.

For instance, security event messages including security event information according to a first protocol are received by a receiving device different from the source device of the message, for example, by a gateway device or a log archive connected to the communication network. The security event information is extracted by the receiving device, and mapped to a second protocol that is configured to be used by other source devices of the PC system for reporting security events. The PC system may be, for example, a Substation Automation (SA) system for a substation in an electrical power system, or a Process Control system for a hydro power plant, a wind power system, or Distributed Energy Resources (DER) that is described by a formal system description at least partly identical to the IEC 61850 SA description, with the first protocol being an IEC 61850-7-4 protocol and the second protocol being a Syslog protocol, or vice-versa.

In accordance with an exemplary embodiment of the present disclosure, a gateway device is connected to the communication network of the PC system, and configured (e.g., adapted) to map, or convert, a message including security event information according to IEC 61850-7-4 into a message including the security event information according to a Syslog protocol. The latter message is subsequently forwarded to a Syslog archive or server, or to another remote event evaluation or archiving application. In parallel, the gateway device may forward without further mapping any security message including security event information according to the Syslog protocol.

In accordance with an exemplary embodiment, the gateway device is also configured to identify alarms, based on a security event severity indication included in the security event information according to IEC 61850-7-4, and to map, or convert, the message to a Network Control Center (NCC) protocol such as IEC 60870-101, IEC 60870-104, or DNP, for example.

In accordance with an exemplary embodiment of the present disclosure, a Syslog archive is connected to the communication network of a Substation Automation system, and further configured to receive, as an IEC 61850 client, IEC 61850-7-4 messages including security event information. The latter information is extracted, and mapped or converted to a Syslog protocol to generate a Syslog security event log. The latter is stored at the Syslog archive in a consolidated way along with other security event logs and eventually offered, as a Syslog server, to further clients.

In accordance with an exemplary embodiment of the present disclosure, a gateway device is connected to the communication network of a Substation Automation system, and configured to map or convert a message including security event information according to a Syslog protocol into a message including the security event information according to IEC 61850-7-4 instead of a conventional Network Control Center (NCC) protocol. The latter message is subsequently forwarded beyond the SA communication network, for example, to an NCC for alarm evaluation, along with any security message including security event information according to IEC 61850 and received and forwarded by the gateway in unmapped format.

In accordance with an exemplary embodiment, an identification of the first security event message according to the Syslog protocol is achieved by parsing the message and character-wise comparing with positive/negative identifier character-strings from a library.

In summary, the present disclosure provides a mechanism to extract relevant security events from general IEC 61850 events and to suitably map the former in view of a consolidation with standard IT or other security events at station level or even higher system levels. Thus, the coexistence of two security protocols on the substation bus is allowed, and greater flexibility in the design of the SA system is achieved, for example, of SA systems with a mix of IEC 61850-compliant IEDs and SA devices that do not adhere to IEC 61850 communication protocols.

The present disclosure also provides a non-transitory computer-readable recording medium (e.g., a non-volatile memory) having recorded thereon a computer program and/or computer-readable instructions which, when executed by a processor of a computer processing device, cause the computer processing device to control one or more processors of a gateway device configured to be connected to a communication network of a Process Control system.

FIG. 1 depicts a Substation Automation (SA) system with two Intelligent Electronic Devices (IEDs) 10, 11 and a gateway device 20 connected to a substation communication network 15. Sensor 12 as an exemplary non-IEC 61850 compatible device is also connected to the network 15. Switches 151, 152 as exemplary communication network elements are part of the SA system. The gateway device is communicatively connected to a Network Control Center (NCC) 30 of an electrical power transmission network including the substation, and/or to a Syslog archive 31. The gateway device is configured to convey status signals, events, alarms, measurements and disturbance recordings from the SA system to the NCC and/or the Syslog archive. To that purpose, the gateway is itself a Syslog and IEC 61850 client configured to gather all security related events from IEC 61850 IEDs and non-IEC 61850 devices. The dashed line in FIG. 1 indicates security event information transmission involving IEC 61850 to Syslog conversion, while the dash-dot line indicates corresponding information flow including a Syslog to IEC 61850 mapping.

Alternatively, the Syslog archive may be connected to the substation communication network without passing through the gateway device, for example, as a stand-alone station-level device or embedded in an operator workstation or a microScada system.

According to IEC 61850, the Logical Node GSAL (Generic Security Application) may be used to handle security event data, for example, to monitor security violations in the categories authorization, access control, service privileges and inactive associations. GSAL contains different counters for the different categories, and is able to provide events with appropriate individual status texts. The mandatory Data Objects DO corresponding to the categories are designated AuthFail (Authorisation failures), SvcViol (Service privilege violations), AcsCtlFail (Access control failures detected) and Ina (Inactive associations), all using the Data Class SEC (Security counter common data class). The latter in turn includes the following Data Attributes:

cnt number of times an event in this category happened
sev severity, (unknown 0, critical 1, major 2, minor 3, warning 4)
t timestamp
addr IP address from where the request has come, or user id if available
addInfo event text info from the event source, with the following optional text data:
   vendor-ID e.g.: ABB
   format-version e.g.: ABB:02
   vendor-event-id e.g.: ABB:02:3590
   source-seq-of-ev e.g.: ABB:02:3590:987
   device-type e.g.: ABB:02:3590:987:RTU560
   extra-info extra text data relevant to the corresponding event
   event source IEC 61850 IED name or IP address The following table lists a few exemplary and user-defined security event or alarm types together with corresponding Data Objects (DO) according to IEC 61850 in the third column. In the second column entitled Severity, the letter S designates security alarm types (with a severity="critical" in terms of IEC 61850), while the letter W designates security event types that indicate possible warnings in terms of IEC 61850.

| ID & Definition of security event/alarm | Severity | IEC 61850 DO |
| --- | --- | --- |
| ... | | |
| 1120 Log-in failed—Unknown user | S | GSAL.AuthFail |
| 1140 Log-in failed—Wrong password | W | GSAL.AuthFail |
| 1150 Log-in failed—Password expired | W | GSAL.AuthFail |
| 1170 Log-in failed 3 times | S | GSAL.AuthFail |
| ... | | |
| 1460 Parameter changed failed—no rights | S | GSAL.AcsCtlFail |
| 1470 Parameter changed failed—out of range | W | GSAL.SvcViol |
| 1480 Parameter changed failed—wrong type | W | GSAL.SvcViol |
| ... | | |

Devices such as the gateway device or a log server receiving IEC 61850 communications can map or code the security event information from an IEC 61850 packet to a Syslog packet. Any compatible Syslog text format may be used to that purpose. The numeric event identifiers (vendor-event-id) enable localization of the event description text, by mapping the event ID number to the event description text in any local language. By way of example, the following IEC 61850 GSAL message event sample data
cnt: 1
sev: 4 (warning)
t: Sep 28 11:59:18 (UTC)
addr: Anonymous
addInfo: "ABB:02:1140:3567:RTU560:Device01"
can be mapped into the Syslog message packet
<13>Sep28 11:59:18|ABB:02|LogInFail—WrongPwd|1140|3567|Device01|RTU560|Anonymous
where <13> indicates a Syslog priority that for the specific security event "Log-in failed—Wrong password" corresponds to the IEC 61850 severity level "4" (warning).

Prior to embedding security event information received according to a Syslog protocol into a message according to IEC 61850, the former may have to be duly identified, as there generally are a great number of non-security Syslog events that should be discarded. In this context, a difficulty arises due to the fact that the Syslog protocol used today does not impose any format or guideline specification on the Syslog packet data. Each vendor has its own Syslog style and own text messages. Hence, Syslog security event and alarm data must be first filtered/captured and later mapped/bridged to IEC 61850.

To extract/filter relevant Syslog security events and alarms a library rule based engine analyzes incoming Syslog packets and only packets which are identified as security related are mapped to the IEC 61850. Each library rule includes one or several identifier strings preceded with a '+' or a '−' sign that indicates whether the string is to be found in the Syslog packet, or whether the string should not be found in the Syslog packet. An exemplary positive identifier string reads "Log-in failed—Wrong password" and recites corresponding plain-text information published by the manufacturer of the source device. Various evaluation criteria of individual string matches are possible, for example, Syslog packets that achieve a positive score in excess of one (three "+" vs. one "−") are retained for further processing.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. The claim dependencies shall not be construed as excluding further meaningful claim combinations.

What is claimed is:

1. A method of handling security events in a Process Control (PC) system which includes a communication network interconnecting devices of the PC system, the method comprising:

transmitting, on the communication network, by first and second devices of the PC system, security event messages including security event information according to a first protocol and a second protocol, respectively, the first protocol being one of an International Electrotechnical Committee (IEC) 61850-7-4 protocol and a Syslog protocol, and the second protocol being the other one of the IEC 61850-7-4 protocol and the Syslog protocol;

receiving a first security event message according to the first protocol, and extracting security event information from the first security event message; and mapping the extracted security event information to the second protocol, wherein the first protocol is the IEC 61850-7-4 protocol and the second protocol is the Syslog protocol, and wherein the method comprises:

by a gateway device connected to the communication network, converting the extracted security event information into a Syslog message;

providing the Syslog message to a Syslog archive;

by the gateway device, based on a security event severity indication of the first message indicating an alarm, converting the extracted security event information into an Network Control Center (NCC) message according to an NCC protocol; and providing the NCC message to an NCC of the electrical power system.

2. The method according to claim 1, wherein the first protocol is the IEC 61850-7-4 protocol and the second protocol is the Syslog protocol, and wherein the method comprises:

by a log archive connected to the communication network, coding the extracted security event information as a security event log entry according to the Syslog protocol; and storing the log entry at the log archive.

3. The method according to claim 1, comprising:

converting a security event severity indication included in a Data Attribute of a Generic Security Application (GSAL) Logical Node hosted by a source Intelligent Electronic Device (IED) of the first message to a Syslog priority indication.

4. The method according to claim 1, wherein the first protocol is the Syslog protocol and the second protocol is the IEC 61850-7-4 protocol, and wherein the method comprises:

by a gateway device connected to the communication network, converting the Syslog message into an IEC 61850 message; and forwarding the IEC 61850 message to a Network Control Center (NCC).

5. The method according to claim 4, comprising:

comparing, by the gateway device, excerpts of a Syslog event message to a plurality of identifier character strings; and identifying the first security event message based on an outcome of the comparison.

6. A gateway device for a Substation Automation (SA) system automating an electrical power substation, wherein the gateway device is configured to be connected to a substation communication network interconnecting Intelligent Electronic Devices (IEDs) transmitting security event messages according to an International Electrotechnical Committee (IEC) 61850-7-4 protocol and to SA devices transmitting security event messages according to a Syslog protocol, wherein the gateway device is configured to:

receive a security event message from an IED or from an SA device according to the respective protocol;

map security event information extracted from the security event message to the other respective protocol;

based on a security event severity indication of the message indicating an alarm, convert the extracted security event information into an Network Control Center (NCC) message according to an NCC protocol, and provide the NCC message to an NCC of the electrical power substation;

compare excerpts of a message received from an SA device to a plurality of identifier character strings;

identify the message as a security event message based on an outcome of the comparison;

convert the identified security event message into a message according to the IEC 61850-7-4 protocol; and forward the converted IEC 61850 message to a Network Control Center (NCC) of the electrical power substation.

7. The method according to claim 1, wherein the PC system is included in a Substation Automation (SA) system for a substation of an electrical power system.

8. The method according to claim 2, comprising:

converting a security event severity indication included in a Data Attribute of a Generic Security Application (GSAL) Logical Node hosted by a source Intelligent Electronic Device (IED) of the first message to a Syslog priority indication.

9. A non-transitory computer-readable recording medium having a computer program recorded thereon that causes a processor of a computer processing device to handle security events in a Process Control (PC) system, which includes a communication network interconnecting devices of the PC system, wherein in the PC system, first and second devices transmit, on the communication network, security event messages including security event information according to a first protocol and a second protocol, respectively, the first protocol being one of an International Electrotechnical Committee (IEC) 61850-7-4 protocol and a Syslog protocol, and the second protocol being the other one of the IEC 61850-7-4 protocol and the Syslog protocol, wherein the computer program causes the processor to execute operations comprising:

receiving a first security event message according to the first protocol, and extracting security event information from the first security event message; and mapping the extracted security event information to the second protocol, wherein the first protocol is the IEC 61850-7-4 protocol and the second protocol is the Syslog protocol, and wherein the operations comprise:

by a gateway device connected to the communication network, converting the extracted security event information into a Syslog message;

providing the Syslog message to a Syslog archive;

by the gateway device, based on a security event severity indication of the first message indicating an alarm, converting the extracted security event information into an Network Control Center (NCC) message according to an NCC protocol; and providing the NCC message to an NCC of the electrical power system.

10. The non-transitory computer-readable recording medium according to claim 9, wherein the PC system is included in a Substation Automation (SA) system for a substation of an electrical power system.

* * * * *